Oct. 30, 1956 H. MOREINES ET AL 2,769,122

SELF-BALANCING SERVO SYSTEM

Filed April 1, 1953

INVENTORS
HAROLD MOREINES
ABBOTT A. BROWN

BY Oscar B Brumback
ATTORNEY

United States Patent Office 2,769,122
Patented Oct. 30, 1956

2,769,122

SELF-BALANCING SERVO SYSTEM

Harold Moreines, Hillside, and Abbott A. Brown, Paramus, N. J., assignors to Bendix Aviation Corporation, Teterboro, N. J., a corporation of Delaware Application April 1, 1953, Serial No. 346,234

2 Claims. (Cl. 318—28)

Figures 1, 2:
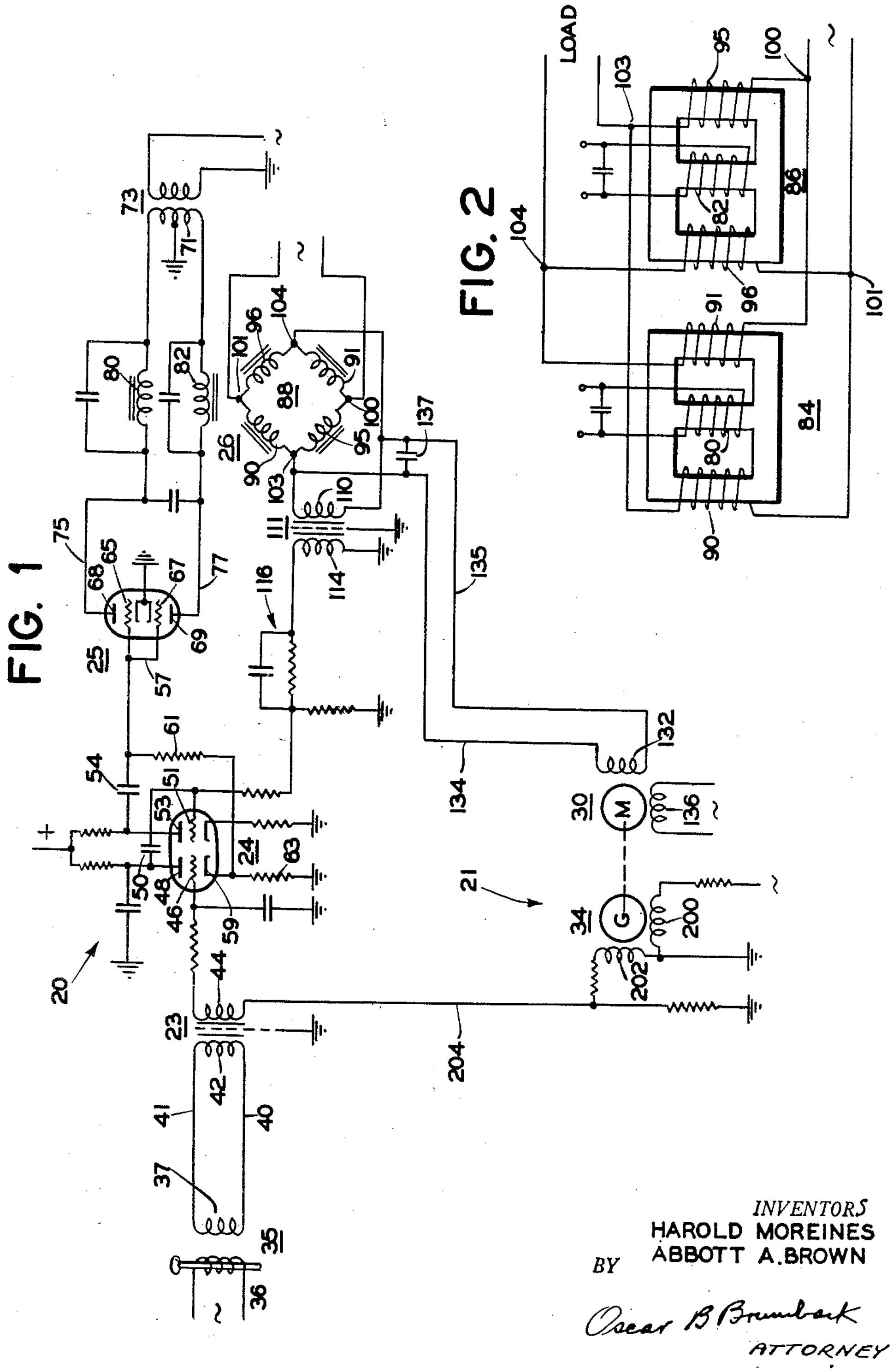

The present invention relates generally to amplifiers and more particularly to magnetic amplifiers.

In applications such as instrument type servo systems, computers, and automatic control systems where unusual durability, simplicity and reliability are required and where due to space and temperature limitations or adverse operating conditions the number of vacuum tubes and other components to be kept at a minimum, magnetic amplifiers are used.

Heretofore, these amplifiers have consisted of two saturable transformers having three windings each: a primary winding energized by alternating current, a control winding adapted to be energized by D. C. current, and a secondary winding in which a current was induced by the primary winding. The secondary windings were connected in series opposition and balanced. When the saturation of one transformer was changed as a result of a direct current flowing in a control winding, the balanced condition was upset and the difference appeared on the amplifier output. Because energy was consumed in overcoming the voltage of the opposition winding, magnetic amplifiers needed to be large in size and tended to heat greatly under sustained conditions of use. The heating frequently resulted in an undesirable shifting in the phase of the output signal.

An object of the present invention, therefore, is to provide a simple magnetic amplifier.

Another object is to provide a novel amplifier that may be small in size and light in weight for the amplification factor involved.

A further object is to provide a novel magnetic amplifier which does not depend upon the inductance from primary to secondary windings.

A still further object is to provide a novel magnetic amplifier in which the output is not the resultant of two opposing outputs.

Still another object of the present invention is to provide a novel servo system in which a servomotor is energized from a source of energy through one of two paths as determined by a control signal.

The above and further objects and novel features of the invention will appear more fully hereinafter from a consideration of the detailed description which follows, taken together with the accompanying drawings wherein an embodiment of the invention is illustrated. It is to be expressly understood, however, that the drawings are for the purposes of illustration and description only, and are not to be construed as defining the limits of the invention.

In the single sheet of drawing wherein like parts are numbered alike:

Figure 1 shows a complete schematic wiring diagram for a servo system utilizing the novel amplifier of the present invention; and Figure 2 shows a schematic diagram of the novel magnetic amplifier of Figure 1.

Turning now to the drawing, Figure 1 shows a servo system utilizing an operative embodiment of the novel amplifier of the present invention. This servo system may be considered as being comprised of two sections: an electrical assembly 20 and a mechanical assembly 21. The electrical assembly is comprised, generally speaking, of an input transformer 23, a preamplifier 24, a discriminator 25 and a magnetic amplifier 26. The mechanical assembly is comprised generally of a two phase induction motor 30 and a rate generator 34.

A suitable control device such as a conventional inductive signal generating device 35 having a rotor 36 displaceable relative to a stator 37 to develop a signal may be used as the control signal source. The signal is applied to input terminals 40, 41 and appears on the primary winding 42 of input transformer 23, inducing a like signal on secondary winding 44. This signal is applied to the grid 46 of preamplifier 24.

Preamplifier 24 may be a twin triode tube in which the signal is given two stages of amplification. The signal applied to grid 46 receives a first stage of amplification, and the signal from plate 48 applied through a blocking condenser 50 to the grid 51 receives a second stage. The output signal from plate 53 is applied through a blocking condenser 54 to a lead 57 of discriminator 25. The signal is also fed back to a cathode 59 by way of resistors 61 and 63, the relative values of these resistors determining the amount of feedback. This negative feedback maintains a relative constant gain for the amplifier.

Twin triode 25, constituting a conventional phase discriminator, has its grids 65 and 67 tied together by lead 57, and its plates 68, 69 excited from the opposite ends of the center tapped secondary winding 71 of a power transformer 73. Grids 65 and 67 are so biased that substantially equal currents flow in leads 75 and 77 when no input signal is present at lead 57. The appearance of an input signal at lead 57, however, unbalances these plate currents; the direction and degree of unbalance depending upon the phase and amplitude, respectively, of the signal.

The direct current component of each plate current flows through control winding 80 and 82 of a novel magnetic amplifier 26. As shown in Figure 2, the magnetic amplifier consists of two saturable core reactors 84 and 86. As is well known, a saturable reactor contains, in addition to alternating current windings, a direct current control winding capable of producing enough ampere turns of magnetization force to magnetize the core to saturation.

Each reactor core 84 and 86 herein has three legs: the direct current control winding is wound on the center leg, and the alternating current excited windings are wound on the outer legs. The outer windings are arranged in a manner well known in the art so that no current is induced in the control winding as a result of the alternating current excitation of the outer windings.

Connecting outer windings 90 and 91 of core 84 with outer windings 95 and 96 of core 86 forms a normally balanced bridge 88. Although the diagonal of the bridge formed by terminals 100 and 101 is excited by an alternating current, no output results at the diagonal formed by terminals 103 and 104 when equal currents flow in leads 75 and 77. The bridge is balanced at this time because the reactor cores are saturated to the same degree by the control windings 80 and 82. This makes the impedance of each leg of the bridge identical. The direct current in the control winding is small so the impedance presented by each leg to the alternating current is relatively great.

When a signal appears at the discriminator grids 65 and 67, however, an unbalance in the direct current flowing in the control windings 80 and 82 occurs: the current in one control winding increases and in the other decreases. Hence one reactor core is saturated by direct current flux to a greater extent and the other to a lesser extent. As a result, the impedance presented to the alternating current by the one diagonally opposite pair of windings which is saturated will decrease while the impedance presented by the other pair will increase. This unbalances the bridge. A larger alternating current then will flow from the energized terminals 100 and 101 through the low impedance windings to the output terminals 103 and 104 then through the high impedance windings. By unbalancing the control windings in an opposite direction, the alternating current output will reverse in direction. Thus, the phase of the alternating current output can be reversed. The phase of the output voltage with respect to an input voltage, however, remains substantially constant.

A portion of the magnetic amplifier output is fed back to the second amplifying stage of preamplifier 20. This stabilizes the system against any drift from its balanced condition that may be caused by an aging of the tubes or other components after the initial balancing adjustments. To form this feedback, a coupling transformer 111 has its primary winding 110 connected across the output terminals 103 and 104 of bridge 88 and its secondary winding 114 connected through a capacitance-resistance phase adjusting device 116 to grid 51 of preamplifier 24.

Turning now to the mechanical assembly 22 of the servo system, the induction motor 30 has two field windings: the variable field winding 132 is connected by leads 134 and 135 to the output of the magnetic amplifier, and the fixed phase winding 136 connected to a suitable source of alternating current. A capacitance 137 across the variable phase winding 132 maintains the quadrature relationship of the voltages in the windings that is necessary for maximum efficiency of the motor. Depending upon the phase of the output from magnetic amplifier 26, motor 30 will turn in a clockwise or counterclockwise direction.

The rotation of motor 30 by way of suitable gearing or other motion transmission turns the rotor of rate generator 34. This generator may be of a conventional type having one winding 200 of generator 34 continuously energized by a source of alternating current and a voltage induced in the other winding 202 when its rotor is turned. This voltage corresponds in phase and amplitude to the direction and rate of rotation of the rotor of the generator. A lead 204 feeds the voltage from winding 202 back in degenerative fashion to the input of the system. This feed back and the input signal to the servosystem are added algebraically at secondary winding 44 of transformer 23.

In operation, a control signal applied to terminals 40 and 41 is given two stages of amplification in preamplifier 24 and impressed by way of lead 57 on grids 65 and 67 of discriminator 25, where its phase is detected. Before this control signal appeared on these grids, substantially equal currents had flowed in leads 75, 77 and control windings 80 and 82. Now, depending upon the phase of the control signal, the balanced current relationship is upset and more current flows in one lead and its associated control winding than in the other lead and its control winding.

Control windings 80 and 82 are the inner legs of two balanced reactor elements 84 and 86 whose adjacent outer legs form two opposite arms of bridge network 88. With equal plate currents, the bridge is balanced because the reactor cores are saturated alike and equal impedances are presented to the alternating current by the bridge arms. The unequal currents resulting from the input signal to discriminator 25, however, causes one reactor to become more and the other to become less magnetically saturated. The relative impedance of the bridge arms is changed and an unbalanced bridge output results. The flow of current is greater through the two opposite low impedance windings than through the two opposite high impedance windings. This output energizes motor 30 which drives rate generator 34. The signal developed in the generator is fed back in degenerative fashion to the input signal. This insures that the motor speed will vary linearly with the input signal at transformer 23.

The foregoing has presented a novel amplifier of compact and efficient design in which the phase of the output voltage with respect to the input voltage is substantially constant. The novel magnetic amplifier does not depend upon inductance from primary to secondary windings. The excitation flows from the two excitation terminals through two low resistance direct connection leads to the load. When there is no control signal there is no alternating current flow. Thus, the heating of the magnetic amplifier is minimized.

Although but a single embodiment of the invention has been illustrated and described in detail, it is to be expressly understood that the invention is not limited thereto. Various changes may also be made in the design and arrangement of the parts without departing from the spirit and scope of the invention as will now be understood by those skilled in the art. For a definition of the limits of the present invention, reference will be had primarily to the appended claims.

We claim:

1. A servo system comprising a servomotor having two field windings, alternating current means for continuously energizing one of said field windings, a source of control signals of reversible phase and variable amplitude for variably energizing the other of said field windings, and means for connecting the other field winding with said source for operation by said signals including a preamplifier for raising the amplitude of said signal, a discriminator for receiving the output of said preamplifier and detecting the phase of said signal, a normally balanced Wheatstone bridge, means for applying an alternating current excitation across one diagonal of said bridge, means for connecting said other field winding across the other diagonal of said bridge, means responsive to the output of said discriminator for changing the impedance of opposite arms of said bridge, whereby said bridge is unbalanced to develop an output for operating said servomotor and means for connecting a portion of said bridge output to said preamplifier output in degenerative fashion to stabilize said bridge.

2. In a control system, a Wheatstone bridge, means for applying an alternating current excitation across one diagonal of said bridge, means connected across the other diagonal of said bridge for utilizing the output of said bridge, said bridge normally being balanced so that no output is developed, a source of control signals of reversible phase and variable amplitude, a pre-amplifier for receiving a control signal from said source and developing an output voltage having increased amplitude, a discriminator for receiving said output voltage and developing a further voltage indicating the phase of said output voltage, means responsive to said further voltage for changing the impedance of opposite arms of said bridge, whereby said bridge is unbalanced to develop an output for operating said utilizing means, and means for adding a portion of said bridge output to said preamplifier output in degenerative fashion to stabilize said bridge.

References Cited in the file of this patent

UNITED STATES PATENTS

| | | |
|---|---|---|
| 1,824,577 | Sorensen | Sept. 22, 1931 |
| 2,115,086 | Riggs | Apr. 26, 1938 |

(Other references on following page)

UNITED STATES PATENTS

| | | |
|---|---|---|
| 2,411,607 | Wolfner | Nov. 26, 1946 |
| 2,450,084 | Emerson | Sept. 28, 1948 |
| 2,450,286 | Livingston | Sept. 28, 1948 |
| 2,537,027 | Burkhardt | Jan. 9, 1951 |
| 2,565,157 | Wickerham et al. | Aug. 21, 1951 |

| | | |
|---|---|---|
| 2,652,524 | Hornfeck | Sept. 15, 1953 |
| 2,676,291 | Perkins et al. | Apr. 20, 1954 |

OTHER REFERENCES

"Servomechanism Fundamentals," Lauer, Lesnick, Matson, Fig. 10.2, p. 252, McGraw-Hill Book Co., New York, 1947.